United States Patent [19]
Shimomura et al.

[11] 3,972,166
[45] Aug. 3, 1976

[54] HEAT INSULATION STRUCTURE FOR LIQUEFIED GAS STORAGE TANK

[75] Inventors: Taizo Shimomura, Yokohama; Hitoshi Saito, Zushi; Minoru Sueyoshi; Hiroshi Tsuda, both of Yokohama, all of Japan

[73] Assignee: Ishikawajima-Harima Jukogyo Kabushiki Kaisha, Tokyo, Japan

[22] Filed: Aug. 23, 1974

[21] Appl. No.: 500,180

[52] U.S. Cl. .................................. 52/404; 52/460; 52/471; 220/9 LG; 114/74 A
[51] Int. Cl.² ........................................ B65D 25/18
[58] Field of Search ............... 114/74 A, 78, 72, 65; 220/15, 9 A, 9 LG, 3.1, 9 F

[56] References Cited
UNITED STATES PATENTS

| | | | |
|---|---|---|---|
| 3,082,726 | 3/1963 | Dosker | 114/74 A |
| 3,305,986 | 2/1967 | Mathews | 52/309 |
| 3,339,783 | 9/1967 | Gorman | 220/15 |
| 3,339,784 | 9/1967 | Filstead | 220/15 |
| 3,341,049 | 9/1967 | Forman | 114/74 A |
| 3,800,970 | 4/1974 | Jackson | 220/9 LG |
| 3,811,593 | 5/1974 | Bridges | 114/74 A |

FOREIGN PATENTS OR APPLICATIONS

| | | | |
|---|---|---|---|
| 2,058,445 | 6/1971 | Germany | 114/74 A |
| 271,878 | 7/1964 | Netherlands | 114/74 A |

*Primary Examiner*—John E. Murtagh
*Attorney, Agent, or Firm*—Scrivener Parker Scrivener & Clarke

[57] ABSTRACT

A heat insulation structure for a liquefied gas storage tank is disclosed which comprises a plurality of heat insulation sandwich structure units attached to the outer tank shell. Each sandwich structure unit comprises a plurality of core members or ribs arrayed in spaced apart relation and sandwiched by a top and bottom plate members, and insulating materials filled into the spaces defined by the core members and the top and bottom plate members, and each core member or rib comprises a pair of plywood sheet members spaced apart from each other by a predetermined distance by spacers, and insulating materials filled into the space or spaces defined by the sheet members and spacers. The above construction not only gives much strength to the heat insulation structure in addition to the improved ability to interrupt heat conduction, but also reduces the fabrication cost.

3 Claims, 6 Drawing Figures

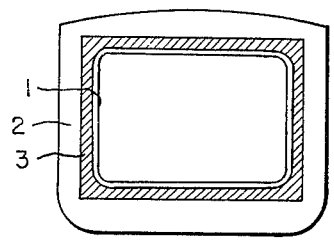
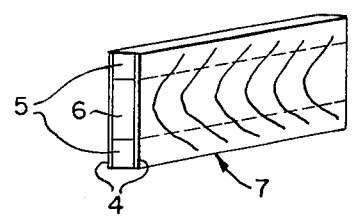
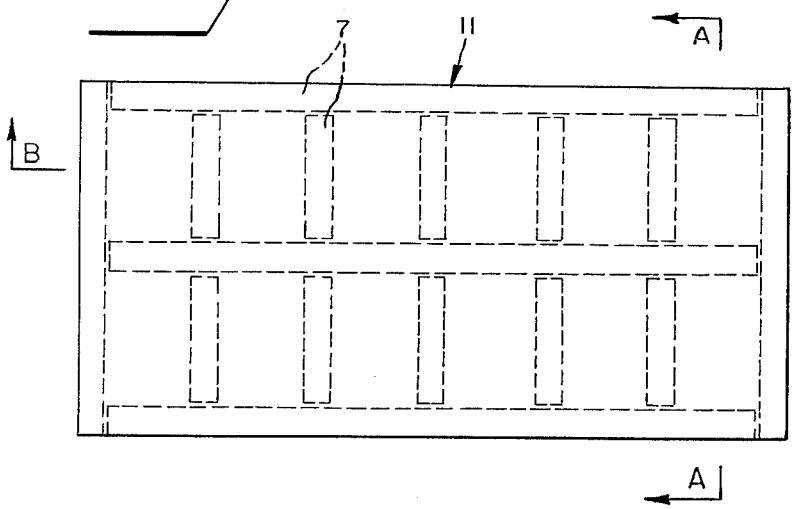
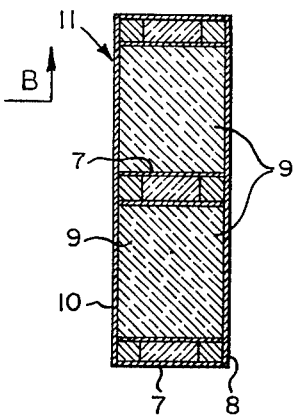
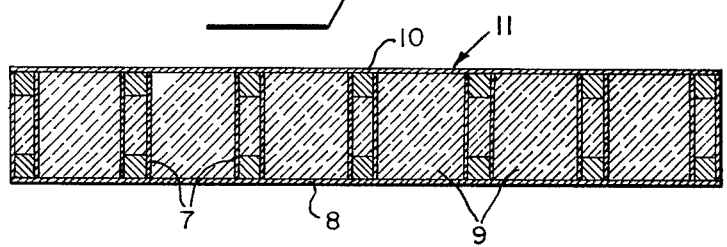
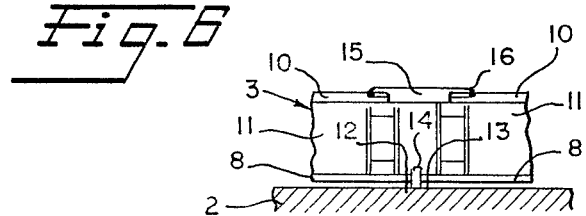

HEAT INSULATION STRUCTURE FOR LIQUEFIED GAS STORAGE TANK

DETAILED DESCRIPTION OF THE INVENTION

The present invention relates to generally a liquefied gas storage tank, and more particularly a heat insulation structure thereof.

There have been devised and used various types of storage tanks such as self-supporting tanks, membrane tanks and so on for liquefied-gas-carriers. The heat insulations for the membrane tanks must not only prevent the over-cooling of the ship's hull and the excessive vaporization of the cargo gas but also have sufficient strength to transmit the loads from the cargo liquefied gas to the hull of the ship. In the past insulating members made of balsa having high strength were overlaid, but balsa is very expensive, thus resulting in the increase in fabrication cost of the heat insulation structure. Furthermore the strength of balsa is limited so that a heat insulation structure for a storage tank in excess of a certain capacity cannot be provided. There have been also used the heat insulation structures for the liquefied gas storage tanks of the type comprising a framework which is made up by wood lumbers having high strength and whose spaces are filled with heat insulating materials such as pearlite. However, this heat insulation structure has a distinct defect that it cannot be attached to the inner plating of the hull of a liquefied-gas-carrier unless the inner plating has a higher degree of flatness. Furthermore, there is a danger that the framework is collapsed under the load exerting thereto in the direction perpendicular to the direction of grains of the wood structural members thereof. To overcome this problem, the framework may be reinforced by many wood ribs disposed at right angles to the direction of the grains of the wood structural members. However, this arrangement results in the reduction in heat insulation efficiency because the insulating materials must be reduced in volume equal to the sum of the volumes of the wood ribs used.

The primary object of the present invention is therefore to overcome or substantially eliminate the above and other defects or problems encountered in the conventional heat insulation structures for the membrane type liquefied gas storage tanks.

Briefly stated, according to the present invention the outer tank shell of a liquefied gas storage tank is covered with a plurality of heat insulation sandwich structure units; each unit comprising a plurality of joists arrayed in spaced apart relation and sandwiched by a pair of top and bottom plate members, and insulating materials filled into the spaces defined by the joists and the top and bottom plate members; and each joist comprising a pair of plate members made of a material capable of exhibiting sufficient strength even at cryogenic temperatures and spaced apart from each other by a predetermined distance by spacers, and insulating materials filled into the spaced defined by the plate members and spacers.

The above and other objects, features and advantages of the present invention will become more apparent from the following description of one preferred embodiment thereof taken in conjunction with the accompanying drawings in which:

FIG. 1 is a diagrammatic sectional view of a liquefied-gas-carrier in which a heat insulation structure in accordance with the present invention is installed between its hull and inner tank shell;

FIG. 2 is a perspective view of a joist used in the heat insulation structure of the present invention;

FIG. 3 is a diagrammatic top view of a heat insulation sandwich structure unit making up the heat insulation structure of the present invention;

FIG. 4 is a sectional view taken along the line A—A of FIG. 3;

FIG. 5 is a sectional view taken along the line B—B of FIG. 3; and

FIG. 6 is a view used for the explanation of the methods for joining the adjacent sandwich structure units and attaching them to the inner plating of the ship's hull.

Referring to FIG. 1, a heat insulating structure 3 in accordance with the present invention is shown as being interposed between an inner tank shell 1 and an inner plating 2 of a ship's hull, and comprises a plurality of sandwich structure units 11 to be described hereinafter.

Each joist 7 of the sandwich structure units 11 comprises, as shown in FIG. 2, a pair of plywood sheets 4 spaced apart by a suitable distance by spacers 5, and an insulating material 6 filled into the space between the sheets 4. The joists 7 of the above construction are arranged and spaced apart from each other by a suitable distance upon a bottom plate 8, and a top plate 10 is attached upon them after an insulating material 9 is filled into the spaces defined by the joists 7 and the bottom plate 8, as shown in FIGS. 3, 4 and 5. A plurality of sandwich structure units 11 of the above construction are attached to the inner plating 2 of the ship's hull so that the heat insulation structure 3 may be assembled.

Next the method for attaching the sandwich structure units 11 to the inner plating 2 will be described. As shown in FIG. 6, the units 11 are attached to the inner plating 2 with bolts 13 extended through project parts 12 of the units 11. In order to permit the heat insulation structure 3 thus constructed to carry the transverse loads acting upon it in parallel with the inner plating 2, the side edges of the bottom plates 8 are pressed against or made into close contact with flat bars or any other suitably formed members 14 attached to the inner plating 2. If the above arrangement is impossible, suitable filler materials may be filled into the spaces between the bottom plates 8 and the flat bars 14. Thus the inner plating 2 may carry through the flat bars 14 the transverse loads acting upon the heat insulation structure 3.

If it is desired to install secondary barrier made of plywood sheets between the inner tank shell 1 and the heat insulation structure 3, the side edges of the top plates 10 of the sandwich structure units 11 are notched or stepped as shown in FIG. 6, and a connecting plate 15 having the mating stepped portions is attached to the adjacent top plates 10 to bridge them. Thereafter sealing materials 16 are applied to the joists between the connecting plates 15 and the top plates 10. Thus, the top plates 10 of the units 11 may make up the secondary barrier.

The loads from the inner tank shell 1 or the secondary barrier (not shown) are transmitted through the top plates 10, the joists 7, and the bottom plates 8 to the inner plating 2. Therefore the hull of the ship carries all of the loads from the tank shell 1.

When the transverse loads are exerted to the heat insulation structure 3, the joists 7 are subjected to the shearing forces, which are transmitted to the bottom plates 8 so as to tend to cause the lateral displacement thereof, but the bottom plates 8 are securely attached to the inner plating 2 by the flat bars 14 so that the transverse loads are also transmitted to and distributed over the inner plating 2.

In the fabrication of the joist 7 and the sandwich structure units 11, artificial foam material such as polyurethane may be directly filled into the joists 7 and the units 11 through holes formed in the plywood sheets 4 and the top or bottom plates 10 or 8 so that it may be foamed on the fabrication site.

The spacing or distance between the joists 7 for supporting the bottom plate 8 and the top plate 10 may be suitably selected depending upon the strength of the inner tank shell 1 and/or secondary barrier and upon the degree of cracking of the insulating materials 6 and 9 caused at low temperatures. The spacing or distance may be varied also depending upon the difference in loads exerted from the inner tank shell 1 (the loads exerting to the heat insulatng structure 3 being different, for instance, between the top and bottom of the inner tank shell 1) so that the joists 7 having the same cross sectional area may be used.

The important advantages of the heat insulating structure in accordance with the present invention may be summarized as follows:

i. The loads exerting upon the heat insulating structure may be carried by the joists, that is, by their plywood sheets and spacers so that it is not necessary to take into consideration the strength of heat insulating materials to be used. Therefore, inexpensive, insulating materials may be advantageously used.

ii. Since the facing or the top and bottom plates of the sandwich structure units are supported by the joists, the overall supporting area is increased. Even when the supporting area is increased, the joists themselves have the heat insulating materials filled into their spaces so that the overall heat insulation efficiency is not adversely affected at all.

iii. Since the loads exerted from the top or bottom plates are born by the plywood sheets 4 of the joists in the direction of their crossed grains, the strength of the heat insulating structure may be much increased.

iv. Even when the loads exerted from the inner tank shell varies from one position to another, they may be suitably carried by merely changing the spacings or distances between the joists having the same cross sectional area so that the number of structural components may be minimized, and various types of heat insulation structures capable of withstanding various loading conditions may be fabricated in a simple manner. That is, the fabrication of not only the ribs and spars but also the sandwich structure units may be mechanized, thus resulting in the reduction in cost and a saving in labor.

v. Since the mass production of the sandwich structure units is possible in a factory located outside of a shipyard or the like, the construction of the heat insulation structures the nature of which is quite different from that of the shipbuilding may be carried out independently and more easily.

vi. The adjacent sandwich structure units may be joined to each other by directly joining the adjacent bottom plates and/or bridging the adjacent top plates by the connecting plates. It is not necessary at all to join the ribs in one unit to those in the adjacent unit. Therefore, the assembly of the heat insulation structure may be much facilitated and the strength or rigidity of the units is by no means impaired.

vii. The slight deformation of the inner plating of the ship's hull may be absorbed by the suitable adjustment of the thickness of the bottom plates, and the top plates may make up the secondary barrier. Therefore, it is no longer required to improve the flatness of the inner plating with a higher degree of accuracy.

viii. The transverse loads acting in the direction parallel with the inner plating may be carried without the modification of the sandwich structure units.

So far the present invention has been described as being applied to the liquefied-gas-carrier, but it is to be understood that the present invention may be applied to the liquefied storage tanks erected on the ground. In this case, the load exerted from the inner tank shell are carried of course by the outer tank shell. It is further to be understood that various modifications may be effected without departing from the true spirit of the present invention.

What is claimed is:

1. A heat insulation structure for a liquified gas storage tank comprising a plurality of heat insulation sandwich structure units attached to the outer shell of said storage tank, each sandwich structure unit comprising a plurality of joists arrayed in spaced apart relation and sandwiched by top and bottom plate members made of wood, and heat insulating materials filled in the spaces defined by said joists and said plate members, each joist comprising a pair of sheet members made of wood, and spaced apart from each other by spacers of wood by a predetermined distance, and insulating materials filled into the space defined by said pair of sheet members and spacers, and wherein the outer tank shell is provided with members against which the side edges of said bottom plate members of said sandwich structure units are pressed for the transmission of shearing forces.

2. A heat insulation structure as set forth in claim 1 wherein the members of the outer tank shell are flat bars and filler materials are filled into the spaces between the adjacent side edges of said bottom plate members and said flat bars.

3. A heat insulation structure for a liquified gas storage tank comprising a plurality of heat insulation sandwich structure units attached to the outer shell of said storage tank, each sandwich structure unit comprising a plurality of joists arrayed in spaced apart relation and sandwiched by top and bottom plate members made of wood, and spaced apart from each other by spacers of wood by a predetermined distance, and insulating materials filled into the space defined by said pair of sheet members and spacers, wherein said bottom plate members of said sandwich structure units are provided with parts for attachment to said outer tank shell, said parts being pressed against flat bars attached to said outer tank shell or filled with filler materials into the spaces between said parts and said flat bars; and the adjacent side edges of the adjacent top plate members of the adjacent sandwich structure units are notched or stepped and bridged by a connecting plate member which has the mating notches or steps and whose upper surface is substantially coplanar with those of said adjacent top plate members.

\* \* \* \* \*